United States Patent [19]

Hayakawa et al.

[11] 3,767,400

[45] Oct. 23, 1973

[54] PROCESS FOR THE FORMATION OF POLYMER IMAGES

[76] Inventors: Yoshihide Hayakawa; Masato Satomura, both of 105 Oaza Mizanuma, Asaka, Japan

[22] Filed: Dec. 8, 1971

[21] Appl. No.: 206,000

Related U.S. Application Data

[63] Continuation of Ser. No. 756,005, Aug. 28, 1968, abandoned.

[30] Foreign Application Priority Data

Aug. 28, 1967 Japan.............................. 42/55124

[52] U.S. Cl. ................ 96/48 R, 96/35.1, 96/115 P
[51] Int. Cl. ............................................. G03c 1/70
[58] Field of Search ................ 96/35.1, 48 R, 115 P

[56] References Cited
UNITED STATES PATENTS

| | | | |
|---|---|---|---|
| 3,019,104 | 1/1962 | Oster | 96/29 |
| 2,887,376 | 5/1959 | Tupis | 96/35 |
| 3,697,275 | 10/1972 | Hayakawa et al. | 96/48 R |

*Primary Examiner*—Ronald H. Smith
*Attorney*—Sughrue, Rothwell, Mion, Zinn & Macpeak

[57] ABSTRACT

A process useful for forming a polymer image which comprises reacting a photographic silver halide emulsion bearing a latent image with at least one compound selected from the group consisting of 2-pyrazoline-5-one, a derivative thereof, 3-pyrazoline-5-one and a derivative thereof in the presence of at least one compound selected from the group consisting of an addition polymerizable vinylidene monomer and vinyl monomer, whereby the polymerization of said monomer is selectively induced at the latent image bearing portion of the emulsion.

29 Claims, 1 Drawing Figure

PROCESS FOR THE FORMATION OF POLYMER IMAGES

Figure 1:
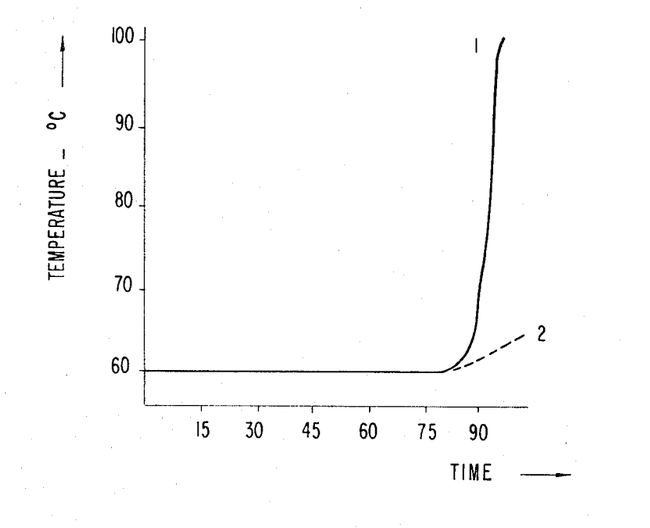

This is a continuation, of application Ser. No. 756,005, filed Aug. 28, 1968, now abandoned.

The present invention relates generally to a process for producing polymer images and more particularly to a process for forming a high molecular weight material selectively at the areas corresponding to photographic latent images by the action of a photographic silver halide emulsion and a reducing agent.

Various processes have been proposed for forming high molecular weight compounds by the photopolymerization of vinyl compounds. Furthermore, it has been proposed to cause directly the photopolymerization by using a silver halide as the catalyst (e.g., British Pat. No. 866,631 and S.Levinos et al.; "Photographic Science & Engineering"; Vol 6, 222–226 (1962). However, in the above reaction, it is considered that the product formed by the photodecompositions of silver halide acts directly as the catalyst for the polymerization and hence the reaction is not so sensitive as in the case of reducing silver halide grains by a conventional developer.

Also, it has been proposed to form images of a high molecular weight compound by developing exposed silver halide emulsion grains in a conventional developer and thereafter conducting the polymerization of a vinyl compound by utilizing as a catalyst the silver image thus formed or the unreacted silver halide (e.g., Belgian Pat. No. 642,477). However, this process is accompanied with the defect that the developing procedure must be conducted separately from the polymerization procedure.

A process, in which exposed silver halide grains are developed by a reducing compound under the presence of a vinyl compound and the vinyl compound is polymerized by the oxidation product or an intermediate product thereof formed during the development, is very interesting from a theoretical point of view, since in such a process, both of the amplification action by development and the amplification action by chain polymerization can be utilized. Thus, it has already been proposed to conduct the aforesaid reaction using as a reducing agent a so-called benzonoid compound, a compound having at the ortho or para positions with each other on a benzene ring at least two hydroxyl groups, amino groups, or amino groups substituted by alkyl groups or acyl groups (e.g., U.S. Pat. No. 3,019,104 and G.Oster, "Nature;" Vol. 180,1275 (1957)).

Thus, an object of this invention is to provide a process for converting images given by light exposure or high energy ray radiations into the images of consisting of a high molecular weight compound.

Other object of the present invention is to provide a process for obtaining polymer images having desired properties by utilizing the above process.

The inventors have found that when a silver halide is reduced with a 2-pyrazoline-5-one or a 3-pyrazoline-5-one under the presence of a vinyl compound, the vinyl compound is polymerized. Moreover, it has been found that when in this case a photographic silver halide emulsion is used as the silver halide, the reaction occurs more rapidly in the case where the fine crystals of silver halide contain the development nuclei, and accordingly when the reaction is conducted under a proper reaction condition and for a proper reaction time, the polymerization can be selectively induced only in the areas where silver halide particles having the development nuclei are present.

The objects of this invention can be attained utilizing the above finding, that is, according to the present invention, there is provided a process in which at least one of an addition polymerizable vinylidene monomer and vinyl monomer is reacted with a photographic silver halide emulsion having latent images in the presence of a 2-pyrazoline-5-one, a derivative thereof, a 3-pyrazoline-5-one, or a derivative thereof, whereby the polymerization of the monomer is caused selectively at the latent image bearing areas.

A photographic latent image is formed in a photographic silver halide emulsion layer by light-exposure or high energy ray irradiation and usually invisible but becomes visible when developed. In an emulsion layer forming a usual negative image, the formation of a latent image is accomplished by the formation of development centers on the silver halide grains which are irradiated by light or high energy rays on the other hand, in an emulsion layer for direct positive image, the latent image is formed by forming development centers on every silver halide grains at first, and thereafter destroying the development centers by the irradiation of light or high energy rays (see; James & Huggins; "Fundamentals of Photographic Theory," 2nd Eddition, Morgam & Morgam Co. (1960), Paragraphs 3 and 4).

As the silver halide photographic emulsion used in the present invention, any of the aforesaid silver halide emulsion for forming a negative images by development and the silver halide emulsion for forming direct positive images may be employed effectively.

As the silver halide used in the photographic silver halide emulsion for forming negative images by development, there may be employed silver chloride, silver bromide, silver chlorobromide, silver iodobromide, and silver chloro-iodobromide. The aforesaid photographic silver halide emulsion used in this invention may be subjected to a chemical sensitization and an optical sensitization usually employed for photographic silver halide emulsions. That is, the photographic silver halide emulsion may be subjected to a sulfur sensitization and a noble metal sensitization as the chemical sensitization (e.g., P.Glafkides; "Chimie Photographique," 2nd Eddition, 247-301 (1957), Photocinema Paul Montel, Paris) and may be subjected to a cyanine dye sensitization or a merocyanine dye sensitization as the optical sensitization. Also, the photographic silver halide emulsion used in this invention may contain a stabilizer usually employed in photographic technique.

The photographic silver halide emulsion for direct positive image and used in the present invention may be prepared by utilizing a solarization, a Herschel effect, a Clayden effect, or a Sabattier effect. These effects are described in, for example, C.E.K.Mees; "The Theory of the Photographic Process," 2nd Edition, Paragraphs 6 and 7, MacMillan Co. (1954). In order to preparing the photographic silver halide emulsion by utilizing the solarization, a light sensitive layer of a photographic silver halide emulsion susceptible to solarization is prepared and is light-exposed or treated with a chemical preliminary to such extent that the layer can be sufficiently developed without subjecting it to an image exposure. The production of such a kind of photographic silver halide emulsion is disclosed in, e.g., British Pat. Nos. 443,245 and 462,730.

The Herschel effect is caused by exposing to light having a long wave length a silver halide which has been provided with developability wholely by over all exposure or chemical treatment. In this case, it is profitable to employ a silver halide emulsion containing a large amount of silver chloride and also a desensitizing dye such as pinakryptol yellow and phenosafranine is frequently incorporated in the emulsion for promoting the occurence of the Herschel effect. The production of the photographic silver halide emulsion for direct positive images by utilizing the Herschel effect is disclosed in, for example, British Pat. 667,206 and U.S. Pat. No. 2,857,273.

In order to prepare the photographic silver halide emulsion layer for direct positive images by utilizing the Clayden effect, it is necessary to expose the emulsion layer intensely through an image for a short period of time and thereafter expose weakly the whole surface of the emulsion layer. By the latter over all exposure, the areas of the emulsion layer which had not been subjected to the intense image exposure are endowed with developability.

The Sabattier effect occurs when a silver halide emulsion layer is image-exposed and thereafter uniformly exposed while being immersed in a developer or treated with a chemical, whereby the areas of the emulsion layer which had not been image exposed becomes developable.

The Clayden effect as well as the Sabattier effect occurs easily in practice when a silver halide emulsion which tends to form development nuclei more in the inner parts of the grains of silver halide than on the surface of the grains by the first exposure. The production of the silver halide emulsion capable of easily forming internal development nuclei is described in the specifications of U.S. Pat. 2,592,250; U.S. Pat. 2,497,876; British Pat. 1,011,062; and German Pat. 1,207,791.

The photographic emulsion mentioned above is prepared by dispersing silver halide grains in a solution of a high molecular weight material. As the high molecular weight material, gelatin is most frequently used but a synthetic high molecular weight compound such as polyvinyl alcohol, polyvinyl pyrrolidone, polyacrylamide, and the like or a derivative of a natural high molecular weight compound such as carboxymethylcellulose, cellulose oxyethyl ether, dextran, and the like may be used alone or together with gelatin (see, e.g., F.Evva; "Zeitschrift fur Wissenschaftliche Photographie, Photophysik und Photochemie;" Vol. 52, 1–24 (1957)).

The 2-pyrazoline-5-one and the derivative thereof are the compound shown by the following general formula (I) and the tautomer thereof (I)

wherein $R_1$ represents a hydrogen atom, an alkyl group, a substituted alkyl group, an acyl group, an aryl group, a substituted aryl group, or a heterocyclic group; $R_2$ represents a hydrogen atom, a hydroxyl group, an amino group, a substituted amino group, an alkyl group, a substituted alkyl group, a carboxyl group, an ester thereof, an aryl group, or a substituted aryl group; and $R_3$ represents a hydrogen atom, an alkyl group, a substituted alkyl group, a formyl group, or a substituted formyl group. The carbonyl group at the 5-position of the compound may be acylated, by being isomerized into an enol form. A bis-compound may be formed by combining through said $R_2$ or $R_3$ group, or directly at the 4-position.

Also, the 3-pyrazoline-5-one and the derivative thereof used in the present invention are shown by the following general formula (II)

(II)

wherein $R_4$ represents a hydrogen atom or an aryl group; $R_5$ represents a hydrogen atom or an alkyl group; and $R_7$ represents an amino group or a substituted amino group.

The examples of aforesaid compounds used in this invention are illustrated as follows.

In formula (I), $R_1$, $R_2$ and $R_3$ are illustrated below;

| Compound Number | $R_1$ | $R_2$ | $R_3$ |
|---|---|---|---|
| 1 | phenyl | —H | H |
| 2 | Same as above | —OH | H |
| 3 | do | —$NH_2$ | H |
| 4 | do | —NHCOC(CH$_3$)=CH$_2$ | H |
| 5 | do | —OH | —$C_4H_{9-n}$ |
| 6 | do | —COOH | H |
| 7 | do | —COOC$_2$H$_5$ | H |
| 8 | do | —CH$_3$ | H |
| 9 | do | —CH$_3$ | —CH$_3$ |
| 10 | do | —CH$_3$ | —$C_4H_{9-n}$ |
| 11 | do | —CH$_2$CH$_2$CH$_3$ | H |
| 12 | do | —CH$_2$COOC$_2$H$_5$ | H |
| 13 | do | —CH$_3$ | —C$_2$H$_4$OH |
| 14 | do | —CH$_3$ | —CH$_2$—phenyl |
| 15 | do | —CH$_3$ | —CHO |
| 16 | do | —CH$_3$ | —CH=N—NH—phenyl |

TABLE—Continued

| Compound Number | R₁ | R₂ | R₃ |
|---|---|---|---|
| 17 | do |  | H |
| 18 |  | —CH₃ | H |
| 19 |  | —CH₃ | H |
| 20 |  O₂N— | —CH₃ | H |
| 21 |  NH₂ | —CH₃ | H |
| 22 |  H₂N— | —CH₃ | H |
| 23 |  HO₃S— | —CH₃ | H |
| 24 |  CH₃ | —CH₃ | H |
| 25 |  HO₃S— (Cl, Cl) | —CH₃ | H |
| 26 |  (Cl, Cl) | —NH₂ | H |
| 27 |  NC— (Cl, Cl) | —NH₂ | H |
| 28 |  CH₃O— | —NH₂ | H |
| 29 |  HO₃S— | —COOH | H |
| 30 | H | H | H |
| 31 | H | —CH₃ | H |
| 32 | H | —CH₃ | —CH₃ |
| 33 | H | —CH₃ | —CH₂H₅ |
| 34 | H | —CH₃ | —C₂H₄OH |
| 35 | H | —CH₃ | —CH(CH₃)₂ |
| 36 | H | —CH₃ | —CH₂CH(CH₃)₂ |
| 37 | H | —CH₃ | —C₄H₉-n |
| 38 | H | —CH₃ | —C₅H₁₁-n |
| 39 | H | —CH₃ | —CH₂—  |
| 40 | H | —CH(CH₃)₂ | H |
| 41 | H | —C(CH₃)₃ | H |
| 42 | H | —C₁₈H₃₇ | H |
| 43 | H | —CH₂CH₂CH₃ | H |
| 44 | H |  | 3,4-tetramethylene |
| 45 | H |  | H |
| 46 | H | CH₃O—  | H |
| 47 | —CH₃ | —CH₃ | H |
| 48 | —CH₃ | —CH₃ | —C₄H₉-n |
| 49 | —CH₃ | —CH₃ | —C₂H₄OH |
| 50 | —CH₂CH₂OH | —CH₃ | —C₄H₉-n |

TABLE—Continued

| Compound Number | R₁ | R₂ | R₃ |
|---|---|---|---|
| 51 | 2,4-dichlorophenyl | 3-amino-phenyl-CONH- | H— |
| 52 | 2,4-dichloro-5-methoxyphenyl | phenyl-CONH— | H |
| 53 | 3-chloro-2-methylphenyl | 3-nitrophenyl-CONH— | H |
| 54 | 4-chloro-2-methylphenyl | Same as above | H |
| 55 | 4-chloro-2-methoxyphenyl | ...do... | H |
| 56 | 2-methylphenyl | ...do... | H |
| 57 | 2-methoxyphenyl | ...do... | H |
| 58 | —CO·CH₃ | phenyl | H |
| 59 | naphthalene-2-SO₃H | —CH₃ | H |
| and 60 | 1,5-dimethyl-4-amino-2-phenyl-pyrazol-3-one | | |
| 61 | 1-phenyl-4-(N-benzoylamino)-pyrazol-3(?)- | | |
| 62 | 1-phenyl-pyrazol-3-yl-O·CO·CH₃ | | |
| 63 | 1,4-bis(pyrazol-3-on-5-yl)benzene | | |

TABLE—Continued

| Compound Number | R₁ | R₂ | R₃ |
|---|---|---|---|
| 64 | (structure: pyrazolone dimer with CH₃, OH, linked via O, two phenyl-SO₃K groups) | | |
| 65 | (structure: two pyrazolone units with CH₃ and OCH₃, C=O linkage, two phenyl groups) | | |
| 66 | (structure: pyrazolone with CH₃, CH₂—CH₂—OH, phenyl-NO₂ group) | | |

These compounds as shown above may be prepared by well-known methods as described in, e.g., R.Eiley and P.Wiley; "The Chemistry of Heterocyclic Compounds;" Vol.20, 1964, John Wiley & Sons, New York.

It has recently been reported that 5-pyrazolone derivatives are employed for starting polymerizations in. e.g., H.Brederck, B. Föhnlisch & R.Franz; "Makromoleculare chem.," 92, 70–90 (1966). They reported that according to their research, a 5-pyrazolone derivative started the polymerization of a vinyl compound in the presence of $Cu^{++}$, $Cl^{--}$, and oxygen or a peroxide. However, in such system oxygen, $Cu^{++}$ or a peroxide acts as an oxidizing agent and hence the polymerization occurs regardless of irradiation of light or high energy rays. On the other hand, in the process of this invention a silver halide acts as the oxidizing agent and hence it is important in the present invention that the rate of starting polymerization is influenced by the presence of development nuclei on the silver halide particles, that is, by the irradiation of light or high energy rays.

The reaction mechanism how the polymerization of a vinyl compound occur as the result of the reduction of silver halide has not yet been clarified. But, in general, the polymerization mechanism is considered to be a radical polymerization from the fact that a compound of conducting a radical polymerization can be utilized and the reaction can be carried out in an aqueous solution as well as the use of a radical polymerizing inhibitor can retard the progress of the reaction. It has not yet been clarified whether the radical is directly formed by the reaction of compound (I) or (II) and a silver halide or some interaction of water, oxygen, etc., in the reaction system with them is present. Since no polymerization was observed when a silver halide irradiated had previously been reduced with compound (I) or (II) and a vinyl compound was added to the reaction system, it is clear that the polymerization of vinyl compound occurs simultaneous with the reduction of silver halide. Therefore, it is considered that an intermediate product of a silver halide and compound (I) or (II) contribute the reaction. About the air oxidation of 5-pyrazolone there is a study by S.Veibel and S.C.Linhold (e.g., "Actachem. Scand.," 9, 963–969(1955)) and it has been discovered that the pyrazolone absorbs 1.5 mole equivalent of oxygen to form a radical.

The polymerization in the present invention is considered to be caused by the radicals of pyrazolones formed at the oxidation thereof by a silver halide. When the reaction is stopped after a proper period of irradiation, a high molecular weight compound is selectively formed at only the areas irradiated but when the reaction is further continued, the high molecular weight compound is formed at areas non-irradiated. However, such a phenomenon is similar to a so-called fog formation phenomenon, that is, a phenomenon that when a usual silver halide photographic light sensitive film or paper is developed for an exceesively long period of time, the whole areas thereof are blackened regardless of exposure, hence, the aforesaid phenomenon will not spoil the merits of this invention.

As a method of forming an image of a high molecular weight material by utilizing the light sensitivity of silver halide, there is known a so-called tanning development wherein gelatin is cross-linked by the oxidation product of a well known developer; but in such process the material forming the image is limited to only the cross-linked product of the gelatin. However, in the process of this invention, images of high molecular weight compounds having various properties may be prepared in accordance with vinyl compounds to be employed and therefore, the images having very excellent properties such as dyeing property, chemical resistance, and the like, which have never been attained with the cross-linked product of gelatin, can be obtained.

Furthermore, the inventors have also found that if sulfite ions are present in the reaction system in this invention the polymerization of a vinyl compound can be accelerated.

Sulfite ion may be added to the reaction system, either in the form of a compound, which has originally contained the sulfite ion in the molecule, such as, alkali metal sulfites or ammonium sulfite, or in the form of a compound which will give a sulfite ion as the result of hydrolysis, such as, pyrosulfites of alkali-metals and ammonium or the adducts of bisulfites with aldehydes, such as, formaldehyde or glyoxal. Although the appropriate amount of sulfite ion to be added depends upon the nature and amount of the reducing agent and the vinyl monomer being used, the pH of the system and other factors, more than 0.05, especially more than 0.2 mol per liter of the system is effective.

It is commonly known in the art to add a sulfite in photographic developing solutions, and in such cases it is believed that the sulfite prevents auto-oxidation of a developing agent and uneven development, by reacting with the oxidation products of the developing agents, such as hydroquinone or p-amino-phenol (see, for example, C.E.K.Mees "Theory of the Photographic Process," the second edition, p.652, published by McMillan Co. in 1954). It should be noted that since the intermediate product of oxidation of 2-pyrazoline-5-ones and 3-pyrazoline-5-ones by silver halide initiates polymerization of vinyl compound or compounds in the process of the present invention the polymerization promoting effect of sulfite ion is essentially different from the action of removing oxidation products, as in the ordinary developing solutions mentioned above. The polymerization would be inhibited rather than promoted, if the sulfite simply removes the oxidation products as in conventional developing processes.

While the mechanism of action of sulfite ion in the process of the present invention is not obvious, it may be that the sulfite ion prevents the polymerization inhibiting action of free oxygen.

As the vinyl compound in this invention, there are employed an addition polymerizable vinyl compound which is liquid or solid at normal temperature and a mixture of such vinyl compound. The examples of such compounds are acrylamide, acrylonitrile, N-hydroxymethyl acrylamide, methacrylic acid, acrylic acid, calcium acrylate, sodium acrylate, acrylamide, methyl methacrylate, methyl acrylate, ethyl acrylate, vinyl-pyrrolidone, vinyl methyl ether, vinyl butyl ether, vinyl isopropyl ether, vinyl isobutyl ether, vinyl butyrate, 2-vinylpyridine, 4-vinylpyridine, 2-methyl-N-vinylimidazole, potassium vinylbenzene sulfonate, vinylcarbazole, and the like.

In the process of this invention, a vinyl compound having more than 2 vinyl groups is particularly convenient and such compound may be used together with the aforesaid vinyl compound having one vinyl group or may be used alone. As the examples of such vinyl compound having a plurality of vinyl groups, there are N,N'-methylene-bis-acrylamide, ethylene glycol dimethacrylate, diethylene glycol dimethacrylate, triethylene glycol dimethacrylate, polyethylene glycol dimethacrylate, divinyl ether, divinylbenzene and the like.

In the present invention, a water-soluble vinyl compound is conveniently used but a water-insoluble vinyl compound may be also polymerized by adding it to the reaction system in the form of an emulsion. The emulsification of such water-insoluble vinyl compound may be conducted by means of a suitable stirrer in the presence of a surface active agent and/or a high molecular weight compound according to a conventional manner.

In the process of this invention, any electromagnetic waves or particle rays sensitive to usual photographic light sensitive emulsions can be utilized. That is, visible rays, ultra-violet rays, infrared rays having wave lengths shorter than 1.3 microns, x-rays, gamma rays, alpha rays, and electron rays may be employed.

In carrying out the present invention it is necessary to conduct the step of irradiation by electromagnetic waves or particle rays and the step of reduction and polymerization. In particular in the recording to images, it is necessary that the silver halide grains change their locations little during the period between the irradiation by electromagnetic waves or particle rays and the polymerization in the reaction system and, accordingly, it is preferable that the system be maintained in a highly viscous liquid state or in a gel state. While photographic emulsions have some viscosity and are susceptible to gelling, since they contain natural or synthetic high polymers, some high polymers may be added to the emulsion before use, if necessary.

On irradiation by electromagnetic rays or particle rays the silver halide grains may be dispersed in an aqueous solution or held in a dry gel. Thus, a highly viscous or gelled photographic emulsion on a suitable support or substrate may be subjected to the irradiation, either in an undried state or a dried state. As the reduction and polymerization take place concurrently the reduction should be conducted in the presence of a vinyl compound or compounds. While in the present invention both the vinyl compound and the compound (I) or (II) may be incorporated in the photographic emulsion before exposure, only one of them may be incorporated in the emulsion before exposure, the other being added to the system after the exposure and it is also possible to add both compounds after exposure.

As the reduction and polymerization must be conducted in the presence of water, it is necessary to conduct the reduction and polymerization in an aqueous solution or in a wet gel.

In general the reaction is conducted in the presence of a suitable quantity of an alkali, as it proceeds smoothly under alkaline conditions. While the amount of alkali suitable for the reaction depends on the kind of silver halide, of reducing agent and of high polymer in the system and their concentrations and the reaction temperature, it is preferable to use an amount sufficient to make the pH of the system 6 or more preferably higher than 7. In the cases where the photographic emulsion is used in the form of a coated film on a support, the reaction can be performed by immersing the thus produced photosensitive material in an alkaline aqueous solution, after it has been exposed to the electromagnetic waves or particle rays. In this case the vinyl compounds and/or the reducing agents can be conveniently dissolved in the aqueous alkaline solution.

Although stopping of the reaction is readily achieved by adjusting the pH of the system to, e.g., 5 or less, it may also be attained by cooling, removing the reactants by washing, dissolving the silver halide by fixation or adding a polymerization inhibitor to the system.

In the case where the high polymer as the vehicle for the silver halide grains and the monomeric vinyl compound are mixed and coated together to form a film, it is preferable to add a small amount of an inhibitor for thermal polymerization in order to prevent the spontaneous thermal polymerization of the vinyl monomer. For such a polymerization inhibitor any of the known thermal radical polymerization inhibitors, such as p-methoxyphenol, hydroquinones, 2,6-di-tert.butyl-p-cresol, β-naphthol and the like, can be utilized.

When the vinyl monomer is contained in the system from the first, it is incorporated in an amount by weight of from 1/30 to 30, and preferably from one-fourth to 4 times the amount of the high polymer which is originally present in the system. The silver halide is conveniently used in an amount by weight of from one-twentieth to 2, and preferably one-tenth to one-half times the amount of the high polymer which is originally present in the system. When the reducing agent is to be added to the system before the reaction, it is suitable to add it in the amount of from 1/10 to 20 moles per mole of the silver halide. It is convenient to add the thermal polymerization inhibitor in an amount of from 10 to 20,000 ppm. of the weight of the vinyl compound. In the case where the vinyl monomers are dissolved in the processing solution, it is usually preferable to dissolve them in as high a concentration as possible, hence the preferable concentration of the monomer is determined mainly by the solubility of the monomer in the solution. In the case where the pyrazolone reducing agents are dissolved in the processing solution, it is suitable to dissolve them in a concentration between one-twentieth and 5 mole per liter, and preferable between one-tenth and 1 mol per liter.

It is similar to the ordinary silver halide photographic process in that there can be any interval of time between the exposure to electromagnetic waves or particle rays and the processing of polymerization. In some cases, according to the characteristics of the photographic emulsion or the condition and the length of the interval, the effect of the exposure may be diminished to some extent and in this case the decrease in effect can be cancelled by increasing the amount of the exposure.

In case of applying the process of the present invention in recording images, it is possible to make use of differences in solubility, light scattering, tackiness, dye-receptivity and other physical and chemical properties between monomeric vinyl compounds and polymers thereof. Relief image of polymeric material may be formed by dissolving away unpolymerized portions, after the irradiation and polymerization, making use of the difference in solubility between the polymerized portions and the unpolymerized portions so as to leave the thus formed highly polymerized compound as an image only in the irradiated areas.

In this case, it is convenient that the high polymer originally present in the system can be washed away with unpolymerized vinyl compound Accordingly, it is preferable that the high polymer originally present in the system be a linear, substantially uncrosslinked one, or such a crosslinked one that is susceptible to chain fission or break-up of crosslinkage, and that the highly polymerized compound formed by the polymerization of the vinyl compound is a crosslinked one of so-called three-dimensional structure. For this reason it is convenient to employ a compound having a plurality of vinyl groups, as set forth above, either alone or in combination with a compound having only one vinyl group. It is, however, not essential to employ the compound having a plurality of vinyl groups, since there are many instances where a great difference exists between the portions containing the high molecular substance formed by polymerization of the vinyl compound and the portions not containing such high polymeric substance. This is true even if the resulting highly polymerized substance is a linear soluble one, due to interaction of the highly polymerized substance formed by polymerization and the high polymer originally present in the system, as in the case of polyacrylic acid and gelatin.

The image which is made by this procedure consists of highly polymerized substances can be applied in various printing processes.

Furthermore, the process of this invention can be utilized for the formation of color images. In such case, a vinyl monomer having a group capable of having a charge by an electrolytic dissociation or the addition of hydrogen cation is used as the vinyl compound to form a polymer capable of having a charge by electrolytic dissociation or addition of hydrogen cation and then the polymer image is selectively dyed by a dye having the opposite charge to that of the polymer. The color images thus formed may be transferred to other support by various manners.

The examples of such addition polymerizable vinyl compound capable of having a charge by electrolytic dissociation or addition of hydrogen cation used in this invention are as follows: As the monomer capable of providing a negative charge to the high molecular weight compound formed from the monomer, there may be employed a vinyl compound having a carboxyl group, such as acrylic acid, methacrylic acid, itaconic acid, and maleic acid; a vinyl compound having a metal salt or ammonium salt of a caboxyl group, such as, ammonium acrylate, sodium acrylate, potassium acrylate, calcium acrylate, magnesium acrylate, zinc acrylate, cadmium acrylate, sodium methacrylate, potassium methacrylate, magnesium methacrylate, calcium methacrylate, zinc methacrylate, cadmium methacrylate, sodium itaconate, and sodium maleate; a vinyl compound having a sulfonic acid group such as vinyl sulfonic acid, and p-vinylbenzene sulfonic acid; and a vinyl compound having a metal salt or ammonium salt of sulfonic acid, such as, ammonium vinyl sulfonate, sodium vinyl sulfonate, potassium vinyl sulfonate, potassium p-vinylbenzene sulfonate. Also, as a vinyl compound providing a positive charge to the high molecular weight compound formed from the monomer, there are a vinyl compound having a basic nitrogen atom, such as, 2-vinylpyridine, 4-vinylpyridine, 5-vinyl-2-methylpyridine, N,N-dimethylaminoethyl acrylate, N,N-dimethylaminoethyl methacrylate, N,N-diethylaminoethyl acrylate, N,N-diethylaminoethyl methacrylate, and the like and a vinyl compound having a quaternary salt prepared from a base of the aforesaid vinyl compound and ammonium methyl chloride, ethyl bromide, dimethyl sulfate, diethyl sulfate, methyl p-toluenesulfonate, etc. These compounds may be prepared by well known methods or commercially available. These compound may be used alone or as a combination of two or more such compounds. Also, the aforesaid vinyl compound may be used together with a water-soluble addition polymerizable vinyl compound having no charge. As the latter type of vinyl compound, there may be employed acrylamide, N-hydroxymethyl acrylamide, methacrylamide, methyl methacrylamide, vinylpyrrolidone, N,N-methylenebisacrylamide, triethylene glycol dimethacrylate, polyethylene glycol dimethacrylate, and the like. In the case of employing such a vinyl compound having no charge, the reactivity and the proportion of the vinyl compound must be so selected that a high molecular weight compound having substantially no electrolytically dissociating group is not formed as the result of the polymerization of only the vinyl polymer having no charge.

As a dye capable of having a charge by electrolytic dissociation used in this invention, there are generally employed conventional acid dyes and basic dyes. When a vinyl compound capable of providing a high molecular weight compound having a negative charge is used, a basic dye is employed, while a vinyl compound capable of providing a high molecular weight compound having a positive charge is used, an acid dye is employed. In other words, as a basic dye has positive charge, it dyes particularly selectively a high molecular weight compound having a negative charge, while as an acid dye has a negative charge, it dyes selectively a high molecular compound having a positive charge. Thus, a color image can be obtained in accordance with the image of the high molecular weight compound.

In the case of employing gelatin as a binder in a photographic emulsion, the isoelectric point of the gelatin must be considered for dyeing since gelatin is an amphoteric electrolyte. In other words, if the pH of the system is lower than the isoelectric point of gelatin to be used, the gelatin is positively charged, while the system the pH is higher than that, the gelatin is negatively charged. Accordingly, when a high molecular weight compound having a negative charge is formed, only the image of the high molecular weight compound can be dyed without dyeing gelatin by dyeing the polymer image with a basic dye at a pH lower than the isoelectric point of the gelatin. Also, the photographic emulsion layer after the formation of images of a high molecular weight compound is first uniformly dyed at a pH higher than the isoelectric point of gelatin and thereafter the layer is washed with a washing solution having a pH lower than the isoelectric point of gelatin, whereby the areas having no images of the high molecular weight compound are washed out to leave the colored image areas of the high molecular weight compound. If it is desired to dye an image of a high molecular weight compound having positive charge with an acid dye, dyeing may be conducted at a pH higher than the isoelectric point of gelatin. Of course, if the pH of the system is too high or too low, the solubility of dye is lowered and electrolytic dissociation of the high molecular weight compound to be charged thereby may be hindered. Thus, the optimum range of pH depends on the kinds of the vinyl compound and the dye as well as the kind of a binder such as gelatin. However, in the case of using usual gelatin subjected to lime processing and having an isoelectric point of about 4.9, the suitable pH of the system is 2.5–4.5 when a high molecular weight compound having a negative charge is dyed by a basic dye and 5.0–8.0 when a high molecular weight compound having a positive charge is dyed with an acid dye.

As the examples of the dyes to be employed in this invention, there are acid dyes such as C. I. Acid Yellow 7 (C.I.56,205), C.I. Acid Yellow 23 (C.I. 19,140). C.I.Acid Red 1 (C.I. 18050), C.I.Cid Red 52 (C.I. 45,100). C.I. Acid Blue 9 (C.I. 42,090), C.I. Acid Blue 45, C.I. Acid Blue 62, (C.I. 62,045), C.I. Acid Violet 7 (C.I. 18,055), and the like. As the basic dye, there are C.I.Basic Yellow (C.I. 49,005), C.I. Basic Yellow 2 (C.I. 41,000), C.I. Basic Red (C.I. 50,240), C.I. Basic Violet 3 (C.I. 42,555), C.I. Basic Violet 10 (C.I. 45,170), and the like.

The number of dye shown above is by the Color Index (2nd eddition) and the aforesaid dyes are commercially available.

In carrying out the process of this invention, it is necessary to conduct the step of irradiation by electromagnetic rays or particle rays, the step of reduction and polymerization, and then the step of dyeing.

Polymer images can be formed by washing away only the unpolymerized portion of the vinyl monomer after exposure, reduction and polymerization, because the polymer is less soluble than the monomer and can scarcely diffuse through the high polymer such as gelatin which is used as a binder for a silver halide photographic emulsion. By utilizing monomers having at least two vinyl groups in combination, insolubility and non-dinsolubility of polymer obtained can be increased. Dye images corresponding to the polymer images are obtained by dyeing, as aforementioned, after polymerization. The images which are made by this procedure can be utilized as clear dye images by fixing a silver halide to remove it and then dissolving out the silver image by applying an oxidizing agent and a solvent for silver salts.

In case where a reducing agent having a high efficiency of initiating polymerization is used in the present invention, it is unnecessary to remove silver images by the oxidation, since enough polymerization reaction is occurred already in such a condition that a very small amount of reduced silver is produced.

Further, the dye images thus produced can be transferred onto other supports. In carrying out a transfer, a support to be transferred must be brought into intimate contact with a layer containing dye images produced as abovementioned, which is wetted with a solvent for the dye such as methanol, water or an aqueous solution of acid, base or salt, As the supports on which the dye image is to be transferred, an ordinary paper or a paper or a film coated with hydrophilic polymer of gelatin can be used. When the dye image is to be transferred to a support which is coated by gelatin, it is preferably to treat it with a mordant such as aluminum salts beforehand in the same way as the usual dye-transfer process. When once an image composed of the ionizable polymer is made, it is possible to make a number of copies by dyeing and transferring as above mentioned, since a few copies can be made with one dyeing and polymer image can be dyed repeatedly.

Although, the invention shall not be limited to them, the invention will be further explained by the following examples.

EXAMPLE 1

A photographic fine grain silver chlorobromide emulsion containing about 60 g./liter of gelatin and about 42 g./liter (as silver) of silver chlorobromide having a mole ratio of chlorine to bromine of 7 : 3 and having a pH of 5.8 and PAg of 7.6 was divided into two part, one of which was exposed to fluorescent lamp. In carrying out the exposure, about 200 ml. of the emulsion, molten at 35°C, was spreaded in a tray of 20 cm. × 25 cm. and the liquid layer was illuminated by the lamp of about 300 luxes for 5 minutes with stirring. Then, 2 ml. of each of the exposed emulsion and unexposed emulsion was poured in a test tube of 1.6 cm. in diameter and after adding 6 ml. of water to the test tube, 4.0 g. of acrylamide was added and further $10^{-4}$ mole of 3-methyl-5-pyrazolone was added. After stirring sufficiently, the temperature of the system in the test tube was adjusted to 60°C. and the test tube was placed in a heat insulating material. The whole system including the heat insulating material was immersed in an aqueous bath at 60°C. Thereafter, 0.01 ml. of a 1 N aqueous sodium hydroxide solution was immediately added to the system and the change in temperature was followed by means of a thermister type recording thermometer. The pH of this system was 6.2. The results are shown in the accompanying drawing, in which the solid line (1) stands for the temperature variation of the exposed emulsion and the dotted line (2) stands for the temperature variation of the unexposed emulsion. In the exposed emulsion, acrylamide was polymerized to cause a temperature increase, thereby the temperature of the system reached 100°C. after about 98 minutes from the beginning of reaction and the content of the test tube became rubbery because of the polyacrylamide thus formed.

On the other hand, in the unexposed emulsion, no temperature increase was observed and the content of the test tube could be easily flowed out. Also, in the system employing the exposed emulsion, the color of the system was found to be brown by the reduction of the silver halide.

When the proportion of acrylamide was increased from 4 g. to 8 g. in the aforesaid system, the reaction period of time was shortened. For example, in the system of employing 8 g. of acrylamide, the system where the exposed emulsion was used reached 100°C. after about 40 minutes while the system of employing the unexposed emulsion reached only 63°C. at the same time.

Thus, it is clear from the generation of the heat of polymerization and variation in the fluidity of the whole system whtat a polymerization occured. Besides the polymerization reaction, heat might be generated by the reduction of silver halide but the amount of such heat was slight if any and the generation of such heat would not be detected as temperature increase. For example, when hydroquinone was used instead of 3-methyl-5-pyrazolone, the silver halide was reduced into black silver but the generation of the heat was not observed. Moreover, the aforesaid fact that the amount of heat generated was influenced by the amount of acrylamide showed that the temperature increase of the system was mainly caused by the heat generated by the polymerization reaction.

In the case of employing the unexposed emulsion, the emulsion generated heat and lost its fluidity when it was reacted for a excessively long period of time. However, such a phenomenon is same as the phenomenon that when a usual photographic emulsion was developed for a longer period of time, the unexposed areas were reduced to form so-called fogs and finally the images are unobservable.

EXAMPLE 2

The same experiment as in Example 1 was repeated while using the pyrazolone shown in the following Table I instead of 3-methyl-5-pyrazolone and also varying the amount of sodium hydroxide. In the table are also shown the amount of the pyrazolone, the temperature of system, the amount of 1 N sodium hydroxide, a period of time until the temperature of the system using the exposed emulsion reached the maximum value and, a temperature of the system where the unexposed emulsion was used. In any cases, it will be understood that in the exposed emulsions, the polymerization occured preferentially. (Table I)

TABLE I

| Sample No. | | Amount (mg.) | Temperature of bath (°C.) | N-NaOH (cc.) | Time until max. temp., min. | Temp. (°C.) | Temp. when unexposed emulsion is used |
|---|---|---|---|---|---|---|---|
| 5 | 1-phenyl-3,5-diketo-4-butyl-pyrazoline | 248 | 30 | 0.0 | 52 | 66 | 30 |
| 47 | 1,3-dimethyl-5-pyrazolone | 11 | 30 | 0.1 | 140 | 647 | 303 |
| 48 | 1,3-dimethyl-4-butyl-5-pyrazolone [1] | 18 | 30 | 0.05 | 93 | 738 | 37 |
| 49 | 1,3-dimethyl-4β-hydroxyethyl-5-pyrazolone [2] | 16 | 30 | 1.0 | 145 | 733 | 31 |
| 50 | 3-methyl-4-butyl-1β-hydroxyethyl-5-pyrazolone [3] | 20 | 30 | 1.0 | 32 | 48 | 35 |
| 6 | 1-phenyl-3-carboxy-5-pyrazolone | 204 | 50 | 2.0 | 170 | 78 | 58 |
| 8 | 1-phenyl-3-methyl-5-pyrazolone | 174 | 50 | 0.5 | 18 | 97 | 50 |
| 12 | 1-phenyl-3-ethoxycarbonylmethyl-5-pyrazolone | 232 | 50 | 0.2 | 95 | >100 | 50 |
| 17 | 1,3-diphenyl-5-pyrazolone | 236 | 50 | 0.2 | 53 | >100 | 50 |
| 18 | 1-(2-pyridyl)-3-methyl-5-pyrazolone | 175 | 50 | 0.5 | 75 | 95 | 57 |
| 20 | 1-p-nitrophenyl-3-methyl-5-pyrazolone | 219 | 50 | 0.2 | 115 | 99 | 59 |
| 26 | 1-(2,6-dichlorophenyl)-3-amino-5-pyrazolone | 255 | 50 | 2.0 | 20 | 87 | 55 |
| 27 | 1-(2,6-dichloro-4-cyanophenyl)-3-amino-5-pyrazolone | 280 | 50 | 0.2 | 23 | 87 | 50 |
| 28 | 1-(4-methoxyphenyl)-3-amino-5-pyrazolone | 213 | 50 | 0.0 | 30 | 62 | 57 |
| 64 | 4,4'-methylidenbis-(1-p-potassium sulfonylphenyl)-3-methyl-5-pyrazolone. | 291 | 50 | 0.1 | 195 | 925 | 80 |
| 65 | 4,4'-bis(phenyl-3-methyl-5-pyrazolone) | 346 | 50 | 2.0 | 27 | 64 | 55 |
| 30 | 5-pyrazolone | 84 | 50 | 0.5 | 40 | 54 | 51 |
| 31 | 3-methyl-5-pyrazolone | 97 | 50 | 0.5 | 40 | 78 | 56 |
| 32 | 3-methyl-4-methyl-5-pyrazolone | 112 | 50 | 0.5 | 25 | 90 | 54 |
| 33 | 3-methyl-4-ethyl-5-pyrazolone | 126 | 50 | 0.02 | 41 | 99 | 52 |
| 34 | 3-methyl-4β-hydroxyethyl-5-pyrazolone | 142 | 50 | 0.5 | 65 | 93 | 50 |
| 37 | 3-methyl-4-butyl-5-pyrazolone | 154 | 50 | 0.1 | 21 | 100 | 50 |
| 38 | 3-methyl-4-amyl-5-pyrazolone | 168 | 50 | 0.02 | 62 | 96 | 50 |
| | 3-methyl-4-acetoacetyl-5-pyrazolone | 183 | 50 | 1.0 | 16 | >100 | 50 |
| 45 | 3-phenyl-5-pyrazolone | 176 | 50 | 0.5 | 72 | >100 | 50 |
| 46 | 3-p-methoxyphenyl-5-pyrazolone | 190 | 50 | 0.3 | 130 | 95 | 50 |
| 56 | 1-(2-methylphenyl)-3-(3-nitrobenzoylamino)-5-pyrazolone | 348 | 50 | 2.0 | 55 | 65 | 50 |
| 1 | 1-phenyl-5-pyrazolone | 176 | 55 | 0.5 | 65 | 80.5 | 80 |
| 2 | 1-phenyl-3-hydroxy-5-pyrazolone | 192 | 55 | 0.5 | 60 | 64 | 558 |
| 3 | 1-phenyl-3-amino-5-pyrazolone | 191 | 55 | 0.2 | 67 | 662 | 122 |
| 7 | 1-phenyl-3-ethoxycarbonyl-5-pyrazolone | 218 | 55 | 1.3 | 106 | 86 | 62 |

TABLE I—Continued

| Sample No. | | Amount (mg.) | Temperature of bath (° C.) | N-NaOH (cc.) | Time until max. temp., min. | Temp. (° C.) | Temp. when unexposed emulsion is used |
|---|---|---|---|---|---|---|---|
| 10 | 1-phenyl-3-methyl-4-butyl-5-pyrazolone | 218 | 55 | 4.0 | 28 | 74 | 815 |
| 13 | 1-phenyl-3-methyl-4-acetoacethyl-5-pyrazolone | 253 | 33 | 1.0 | 35 | ? | ? |
| 14 | 1-phenyl-3-methyl-4$\beta$-hydroxyethyl-5-pyrazolone | 218 | 55 | 3.0 | 10 | 73 | 63 |
| 11 | 1-phenyl-3-propyl-5-pyrazolone | 202 | 55 | 0.02 | 35 | 100 | 52 |
| 16 | 1-phenyl-3-methyl-4-formyl-5-pyrazolonephenyl hydrazone | 292 | 55 | 3.0 | 5 | 75 | 653 |
| 19 | 1-(2-quinolyl)-3-methyl-5-pyrazolone | 235 | 60 | 1.0 | 173 | 88 | 76 |
| 21 | 1-m-aminophenyl-3-methyl-5-pyrazolone | 226 | 55 | 4.0 | 17 | 85.5 | 61 |
| 22 | 1-p-aminophenyl-3-methyl-5-pyrazolone | 226 | 55 | 0.5 | 43 | 95 | 85 |
| 23 | 1-p-sulfonyl-3-methyl-5-pyrazolone | 154 | 55 | 1.0 | 78 | 99 | 607 |
| 24 | 1-O-methylphenyl-3-methyl-5-pyrazolone | 188 | 55 | 0.2 | 12 | >100 | 59 |
| 25 | 1-(3,5-dichloro-4-sulfonyl)-3-methyl-5-pyrazolone | 291 | 55 | 1.5 | 34 | 99 | 575 |
| 29 | 1-(4-sulfonyl)-3-carboxy-5-pyrazolone | 284 | 55 | 1.5 | 69 | 95 | 57 |
| 36 | 3-methyl-4-isobutyl-5-pyrazolone | 154 | 60 | 0.03 | 40 | 97 | 66 |
| 42 | 3-octadecyl-5-pyrazolone | 321 | 55 | 4.0 | 81 | 94 | 79 |
| 44 | 3,4-tetramethylene-5-pyrazolone | 138 | 55 | 1.0 | 46 | 77 | 73 |
| 54 | 1-(5-chloro-2-methyl-phenyl)-3-(3-nitrobenzoylamino)-5-pyrazolone | 383 | 55 | 4.0 | 130 | 723 | 66 |
| 55 | 1-(5-chloro-2-methoxyphenyl)-3-(3-nitrobenzolyamino)-5-pyrazolone | 399 | 55 | 1.0 | 78 | >100 | 84 |
| 4 | 1-phenyl-3-methacrylamino-5-pyrazolone | 275 | 60 | 0.5 | 18 | >100 | 60 |
| 9 | 1-phenyl-3-methyl-4-methyl-5-pyrazolone | 188 | 60 | 2.0 | 5 | 100 | 89 |
| 15 | 1-phenyl-3-methyl-4-formyl-5-pyrazolone | 202 | 60 | | 90 | 93 | 88 |
| 40 | 3-isopropyl-5-pyrazolone | 126 | 60 | 0.3 | 41 | 100 | 60 |
| 41 | 3-t-butyl-5-pyrazolone | 140 | 60 | 0.05 | 63 | 79 | 60 |
| 63 | p-di-3-pyrazoronyebenzene | 242 | 60 | 10.0 | 120 | 90 | 78 |
| 61 | 2-phenyl-4-benzoylamino-3-pyrazoline-5-on | 293 | 60 | 1.0 | 11 | 63 | 60 |
| 43 | 3-propyl-5-pyrazolone | 126 | 55 | 0.2 | 53 | 945 | 625 |
| 66 | 1-p-nitrophenyl-3-methyl-4$\beta$ hydroxyethyl-5-pyrazolone | 163 | 55 | 2.0 | 36 | 845 | 675 |
| 58 | 1-acetyl-3-phenyl-5-pyrazolone | 202 | 575 | 0.5 | 10 | >100 | 575 |
| 62 | 3-phenyl-5-acethylpyrazolone | 20.2 | 58.5 | 1.0 | 108 | 81.5 | 78 |

NOTE: [1], [2] and [3]. The preparative methods and physical characteristics of these compounds were as follows:

[1] Ethyl-$\alpha$-butylacetoacetate and equimolar amount of # $\beta$-hydroxyethyl hydrazine were mixed under stirring and heated at 85° C. for 80 minutes in a water bath. On cooling yellowish material precipitated from the solution. (Yield 63%, M.P. 48–51°). This crude material was recrystallized from ethanol-ether. M.P. 50–53°, $\lambda_{max.}^{99\% EtOH}$ 254 m$\mu$ log $\epsilon$=2.94.

[2] Acetylbutyrolactone and equimolar amount of methyl hydrazine were mixed under ice-cooling and heated at 85° C. for 2.5 hours. On cooling yellowish material precipitated from the solution. The crude material was recrystallized from ethanol-ether. Yield 60%, M.P. 75–78° C., $\lambda_{max.}^{98\% EtOH}$ 253m$\mu$ log $\epsilon$= 2.55.

[3] Ethyl-$\alpha$-butyl aceto-acetate and equimolar amount of methyl hydrazine were mixed under ice-cooling and heated at 80° C. for 2.5 hours. On cooling, yellowish material precipitated from the solution. The crude material was recrystallized from benzene. Yield 72%, M.P. 67–71° C., $\lambda_{max.}^{99\% EtOH}$ 254 m$\mu$ log $\epsilon$=2.85.

EXAMPLE 3

The polymerization was conducted by using polyvinyl alcohol and polyvinyl pyrrolidone without using gelatin as the protective colloid. A silver chlorobromide emulsion containing about 100 g./liter of polyvinyl alcohol, about 30 g./liter of polyvinyl pyrrolidone, and 20 g./liter of fine particles of silver chlorobromide having a mole ratio of chlorine to bromide of 7 : 3 was exposed for 10 minutes as in Example 1 and the results were compared with the same emulsion but unexposed. These experiments were conducted by adding 4 g. of acrylamide, 2 ml. of water, 1 ml. of 1 mole/liter of pyrazolone shown in Table II, and an aqueous 1 N. sodium hydroxide solution in an amount shown in the table II. As shown in Table II, the reaction in the exposed emulsion occured preferentially.

TABLE II

| Sample No. | 1N-NaOH(c.c) | time until max temp. | temp. | temp when unexposed emulsion is used |
|---|---|---|---|---|
| 4. 1-phenyl-3-methaacrylamino-5-pyrazolone | 2.0 | 140 | 82 | 61 |
| 29. 1-p-sulfophenyl-5-pyrazolone-3-calbonic acid | 0.3 | 90 | 61 | 55 |
| 23. 1-p-sulfophenyl-3-methyl-5-pyrazolone | 1.0 | 25 | 100 | 56 |

EXAMPLE 4

In Examples 1–3, water-soluble vinyl compounds were used but a water-insoluble monomer such as tetraethylene glycol dimethacrylate could be polymerized by preparing the emulsion thereof.

Thus, the emulsion of tetraethylene glycol dimethacrylate was prepared by mixing 10 ml. of tetraethylene glycol and 10 ml. of a 4 % gelatin solution and after adding 0.2 g. of sodium dodecylbenzene sulfonate, emulsifying the system by means of a high speed emulsifier. After mixing 8 ml. of the emulsion thus prepared and 2 ml. of the emulsion prepared as in Example 1, the resultant mixture was mixed with 1 ml. of an aqueous 1 N solution of 3-methyl-4-$\beta$-hydroxyethyl-5-pyrazolone, 0.3 ml. of an aqueous 1 N solution of sodium hydroxide, and $10^{-5}$ mole of sodium sulfite and the same experiment as in Example 1 was repeated with the mixture. In the system where the exposed emulsion was employed, the temperature of the system became 66.7°C. by the heat of reaction after 66 minutes while the system where the unexposed emulsion was used reached only 62.5°C. Thus, by using a water-insoluble or weak soluble monomer as an emulsion thereof, the monomer could be selectively polymerized in the presence of a silver halide irradiated by electromagnetic rays or particle rays.

EXAMPLE 5

After image exposing a photographic light-sensitive film having a photographic gelatino silver chloro-iodo bromide emulsion, the film was processed in a solution containing 1-phenyl-3-methyl-5-pyrazolone, acrylamide and methylenebis acrylamide to conduct imagewise polymerization.

The light-sensitive film used in this example had been prepared as follows. That is, after under coating the both surfaces of a polyethylene terephthalate film, one surface thereof was coated by an antihalation layer and the opposite surface thereof was coated with a fine grain gelatino silver halide emulsion containing 100 g. of gelatin and 0.7 mole of chlorine, 0.3 mole of bromide and 0.001 mole of iodine per mole of silver together with a merocyanine dye having the light sensitivity maximum at 550 m.μ.as a sensitizing dye, about 1.5 g. per 100 g. of gelatin of mucochloric acid as a hardening agent, and suitable additives such as a stabilizer and a surface active agent so that the layer thus coated contained 50 mg. of silver per 100 cm². On the emulsion layer was further coated a protective layer of gelatin in a thickness of about 0.8 micron. Such a kind of photographic film is usually used for the preparation of line and half-tone images.

When a negative image having a line image was placed on the film thus prepared, the film was exposed for 2 seconds under the light of about 100 luxes and then immersed in a solution having the following composition under stable red light;

Acrylamide    90 g.
Methylenebis acrylamide    8 g.
1-Phenyl-3-methyl-5-pyrazolone    7.8 g.
Water    100 ml.
2 N-NaOH    23 ml.

When the film was allowed to stand for 20 minutes at 30°C., a faint image began to be observed on the exposed areas. After stopping the reaction by applying an aqueous solution of about 1 % acetic acid followed by washing with water, the gelatin was decomposed by using an aqueous solution of 1 % gelatin-decomposing enzymn (Bioprase PN 4, trade name), whereby the gelatin at the unexposed areas were completely removed, while undecomposed films or layers remained at the exposed areas, which showed the occurence of selective polymerization at the exposed areas.

EXAMPLE 6

The photographic light-sensitive film as in Example 5 was exposed in the same example and processed in a solution of sodium methacrylate and 1-phenyl-3-methyl-5-pyrazolone to provide a polymer image capable of being effectively dyed with a basic dye.

The film exposed was immersed in the solution having the following composition;

Sodium methacrylate    60 g.
1-phenyl-3-methyl-5-pyrazolone    6.1 g.
2 N sodium hydroxide solution    necessary for adjusting the PH to 9.95.
Water    60 ml.

When the film thus processed was allowed to stand for 30 minutes at 30°C., a light brown image was formed at the exposed area. The sample was washed with an aqueous 1.5 % acetic acid solution for 30 second fixed in the fixing solution having the following composition;

Sodium thiosulfate (anhydrous)    150 g.
Potassium methabisulfite    15 g.
Water to make    1 liter After fixing sufficiently and rinsed with water, the sample was immersed in a 0.1 % aqueous solution of red basic dye (Rhodamine 6 G.C.P., C.I.Basic Red 1) for 5 minutes at room temperature. Thereafter, when the sample was washed with an aqueous 5 % acetic acid solution for 5 minutes, the dye at the areas except the brown images was washed out, while the image portions remained colored in red. Since the brown image was silver image, the silver image could be removed by Farmer's reducer. By removing the silver image, a clear red image was obtained. When the order of dyeing an removal of silver image was changed, that is, the silver image was first removed to provide a colorless and transparent image and thereafter the image was dyed, a clear red image was also obtained.

The dye image thus prepared could be transferred to a paper. Thus, the surface of a usual writing paper was lightly rubbed by a sponge containing methanol to wet the surface with methanol, the color image prepared above was closely contacted to the wet surface of the paper, and the both members were separated after about 30 seconds, whereby the red image was trasferred onto the paper.

By using Crystal Violet (C.I. Basic Violet 3) as a 0.1 % aqueous solution, the dye image was prepared by the same procedure and the blue-violet image could be transferred to a paper.

Also, by using a 0.1% aqueous solution of Auramine 1-100,(C.I. Basic Yellow 2), a yellow image was obtained. Moreover, by using a 0.1% aqueous solution of Basic Blue G.O.,(C.I.Basic Blue 25),a blue image was obtained.

In the case of transferring the dye image, it was unnecessary to remove the silver image or to remove silver halide, and hence by immersing the film in a stopping bath after conducting development and polymerization, washing with water,and then immediately dyeing and transferring the image, a good transferred image could be obtained.

EXAMPLE 7

The same photographic light sensitive film as in Example 5 was exposed as in Example 5 and processed in the liquid having the following composition to conduct the development and polymerization;

Sodium methacrylate    75 g.
3-Methyl-4-ethyl-5-pyrazolone    5.7 g.
Potassium pyrosulfite    3.0 g.
2 N Sodium hydroxide solution    necessary amount for adjusting the P$^H$ to 9.0
Water    75 ml.

By processing for 60 minutes at 30°C., a faint silver image and the image of polymethacrylic acid were obtained. The image could be dyed by Rhodamine 6 G.C,P. or Crystal Violet and the like as in Example 6 and also the dye image could be transferred onto a paper wetted by methanol.

EXAMPLE 8

The same photographic light-sensitive film as in Example 5 was exposed as in the same example and processed in a solution having the following composition to conduct the development and polymerization;

1-Vinyl-2-methyl imidazol    40 g.
1-Phenyl-3-methyl-5-pyrazolone    3.7 g.
Potassium methabisulfite    3.0 g.
Water    75 ml.
2 N sodium hydroxide    necessary for adjusting the P$^H$ to 10.5

When the film was processed for 1 minute at 30°C., a faint brown silver image was formed together with an image of polyvinylmethyl imidazole. After fixing and water rinsing, the image was dyed with a blue acid dye Suminol Leveling Sky Blue R extra Conc.(C.I. Acid Blue 62) and the image was washed for 5 minutes by a 1 % aqueous solution of sodium bicarbonate to provide a blue image. The image could be transfterred to a sheet of writing paper wetted by ethanol. The image could also be transferred to a transferring paper wetted by water. (Table 3)

EXAMPLE 9

The same film as in Example 5 was exposed as in the example and processed in the solution having the following composition;
Methacrylic acid    58.9 ml.
Sodium carbonate(monohydrate)    43.0 g.
Reducing agent    Table III
Water    87.5 ml.
Sodium hydroxide solution (2 N)    necessary for adjusting the $P^H$ to 10.0 or 9.0

After processing at 30°C. for a period of time shown in Table III, the sample was fixed, rinsed with water, and dyed with 0.1% Rhodamine 6 G. as in Example 5. The transmission density to green light of the exposed portion and unexposed portion was measured before and after dyeing. The kind of reducing agents, the amount thereof, the $P^H$ at processing, the processing time, the optical density before dyeing and the optical density after dyeing are shown in Table III.

the unexposed portion and the exposed portion was selectively dyed. This was also clear from the fact that by removing the silver image in each sample with a Farmer's reducer, a clear red image was obtained. Also, when the sample had a silver image having low density, a clear or sharp red image was obtained without removing the silver image. Also, such dye image could also be transferred to a methanol-wetted paper as in Example 6.

EXAMPLE 10

The film as in Example 5 was exposed as in the Example and processed in the solution having the following composition;
Sodium methacrylate    7.5g.
Reducing agent    Table IV
Sulfite    Table IV
Water    7.5 ml.
1 N sodium hydroxide    necessary amount for adjusting the $P^H$ to 9.

TABLE III

| Sample number | Reducing agent | Amount of reducing agent (g.) | Processing time (min.) | Density of unexposed portion Before dyeing | Density of unexposed portion After dyeing | Density of exposed portion Before dyeing | Density of exposed portion After dyeing | pH |
|---|---|---|---|---|---|---|---|---|
| 4 | 1-phenyl-5-pyrazolone-3-carboxylic acid | 9.18 | 30 | 0.24 | 0.25 | 0.28 | 0.56 | 10 |
| 28 | 1-(4-methoxyphenyl)-3-amino-5-pyrazolone | 9.58 | 10 | 0.20 | 0.26 | 0.31 | 0.46 | 10 |
| 8 | 1-phenyl-3-methyl-5-pyrazolone | 7.83 | 30 | 0.18 | 0.26 | 0.20 | 1.66 | 10 |
| 26 | 1-(2,6-dichlorophenyl)-3-amino-5-pyrazolone | 11.48 | 30 | 0.14 | 0.35 | 0.20 | 4.36 | 9.9 |

It will be understood that in any cases the density by dyeing of the exposed portion was higher than that of the unexposed portion.

It was observed that the exposed portion was selectively dyes as in Example 9.

TABLE IV

| Sample number | Reducing agent | Amount of reducing agent (g.) | Processing time (min.) | Density of unexposed portion Before dyeing | Density of unexposed portion After dyeing | Density of exposed portion Before dyeing | Density of exposed portion After dyeing | Sulfite (g.) |
|---|---|---|---|---|---|---|---|---|
| 8 | 1-phenyl-3-methyl-5-pyrazolone | 0.783 | 30 | 0.08 | 1.44 | 0.09 | 1.97 | Sodium sulfite, 1.2. |
| 28 | 4-methoxyphenyl-3-aminopyrazolone | 0.96 | 10 | 0.19 | 0.21 | 0.41 | 0.53 | Do. |
| 45 | 3-phenyl-5-pyrazolone | 0.72 | 90 | 0.08 | 0.75 | 0.08 | 0.93 | Potassium metabisulfite 0.3. |
| 18 | 1-pyridyl-3-methyl-5-pyrazolone | 0.79 | 70 | 0.08 | 0.14 | 0.08 | 0.49 | Do. |
| 3 | 3-amino-1-phenyl-5-pyrazolone | 0.79 | 45 | 0.07 | 0.48 | 0.09 | 1.12 | Do. |
| 5 | 1-n-butyl-3,5-diketo-1-phenylpyrazolone | 1.04 | 30 | 0.07 | 0.88 | 0.07 | 1.89 | Do. |
| 65 | bis-1-phenyl-3-methyl-5-pyrazolone | 1.55 | 30 | 0.06 | 0.27 | 0.35 | 1.11 | Do. |
| 31 | 3-methyl-5-pyrazolone | 0.44 | 30 | 0.06 | 0.49 | 0.07 | 1.08 | Do. |
| 2 | 1-phenyl-3-hydroxy-5-pyrazolone | 0.79 | 25 | 0.06 | 0.33 | 0.09 | 1.22 | Do. |
| 34 | 3-methyl-4-(2-hydroxyethyl)-5-pyrazolone | 0.64 | 20 | 0.06 | 0.36 | 0.06 | 1.07 | Do. |
| 20 | 1-p-nitrophenyl-3-methyl-5-pyrazolone | 0.99 | 30 | 0.08 | 0.35 | 0.14 | 1.22 | Do. |
| 12 | 1-phenyl-5-pyrazolone-3-ethylacetate | 1.11 | 7 | 0.07 | 0.70 | 0.35 | 1.52 | Do. |
| 17 | 1,3-dimethyl-5-pyrazolone | 1.06 | 30 | 0.74 | 2.55 | 0.84 | 2.58 | Do. |
| 4 | 1-phenyl-3-metaacrylamino-5-pyrazolone | 1.1 | 12 | 0.11 | 0.24 | 0.16 | 1.00 | Do. |
| 29 | 1-phenyl-5-pyrazolone-3-carboxylic acid | 1.3 | 25 | 0.08 | 0.13 | 0.08 | 0.28 | Do. |
| 23 | 1-p-sulfonyl-3-methyl-5-pyrazolone | 1.1 | 60 | 0.07 | 0.15 | 0.08 | 0.35 | Do. |
| 22 | 3-methyl-1-O-tryl-2-pyrazoline-5-one | 0.85 | 60 | 0.08 | 0.15 | 0.08 | 0.38 | Do. |
| 21 | 1-m-(aminophenyl)-3-methyl-5-pyrazolone | 1.0 | 13 | 0.26 | 0.37 | 0.43 | 1.26 | Do. |
| 32 | 1-p-(aminophenyl)-3-methyl-5-pyrazolone | 0.85 | 13 | 0.08 | 0.18 | 0.19 | 1.55 | Do. |
| 60 | 4-aminoantipyrine | 0.91 | 4 | 0.07 | 0.14 | 0.11 | 0.82 | Do. |
| 36 | 3-methyl-4-isobutyl-5-pyrazolone | 0.69 | 30 | 0.08 | 0.17 | 0.09 | 1.54 | Do. |
| 33 | 3-methyl-4-ethyl-5-pyrazolone | 0.57 | 60 | 0.08 | 0.15 | 0.08 | 1.58 | Do. |
| 35 | 3-methyl-4-isopropyl-5-pyrazolone | 0.51 | 60 | 0.07 | 0.20 | 0.08 | 1.62 | Do. |
| 38 | 3-methyl-4-amyl-5-pyrazolone | 0.76 | 30 | 0.07 | 0.16 | 0.08 | 1.48 | Do. |
| 9 | 1-phenyl-3,4-dimethyl-5-pyrazolone | 0.74 | 20 | 0.07 | 0.16 | 0.09 | 1.72 | Do. |
| 41 | 3-t-butyl-5-pyrazolone | 0.63 | 60 | 0.07 | 0.14 | 0.08 | 0.27 | Do. |
| 44 | 3,4-tetramethylene-5-pyrazolone | 0.61 | 60 | 0.07 | 0.29 | 0.07 | 0.52 | Do. |
| 32 | 3,4-dimethyl-5-pyrazolone | 0.50 | 30 | 0.07 | 0.16 | 0.11 | 1.75 | Do. |
| 45 | 3-phenyl-pyrazolone | 0.72 | 60 | 0.08 | 0.24 | 0.11 | 0.34 | Do. |
| 10 | 1-phenyl-3-methyl-4-n-butyl-5-pyrazolone | 0.59 | 31 | 0.10 | 0.47 | 0.60 | 2.23 | Do. |
| 3 | 1-phenyl-3-methyl-4-acetoacetyl-pyrazolone | — | — | 0.08 | 0.20 | 0.09 | 1.80 | Do. |
| 13 | 1-phenyl-3-methyl-4-β-hydroxyethyl-5-pyrazolone | 0.98 | 60 | 0.07 | 0.26 | 0.14 | 1.96 | Do. |
| 48 | 1,3-dimethyl-4-butyl-5-pyrazolone | 0.76 | 9 | 0.09 | 0.24 | 0.14 | 2.91 | Do. |
| 49 | 1,3-dimethyl-4-β-hydroxyethyl-5-pyrazolone | 0.70 | 60 | 0.07 | 0.64 | 0.16 | 2.82 | Do. |
| 50 | 1-β-hydroxyethyl-3-methyl-4-butyl-5-pyrazolone | 0.89 | 30 | 0.08 | 0.31 | 0.14 | 3.33 | Do. |

EXAMPLE 11

As in Example 10, the exposed film was processed in the solution having the following composition;

Methacrylic acid   7.5 g.
Reducing agent   Table V
Sulfite   Table V
Water   7.5 ml.

1 N sodium hydroxide   necessary amount for adjusting the pH to the value of Table V.

The results are shown in Table V.

Calcium methacrylate (66% aq. soln.)   75 ml.
Gelatin   6.5 g.
Water   30 ml.
p-Methoxyphenol (1/50 mole aq.soln.)   1 ml.
Mucochloric acid (2% aq. soln.)   1.2 ml.
Sodium dodedylbenzene sulfonate (1% aq. soln.) 181 ml.

The film thus prepared was exposed for 1 second through a line image original to a xenon lamp to 500 watts with a distance of 50 cm. therefrom and then the

TABLE V

| Sample No. | Reducing agent | Amount of reducing agent (g.) | Processing time (min.) | Density of unexposed portion Before dyeing | Density of unexposed portion After dyeing | Density of exposed portion Before dyeing | Density of exposed portion After dyeing | Sulfite, potassium metabisulfite (g.) | pH |
|---|---|---|---|---|---|---|---|---|---|
| 30 | 5-pyrazolone | 0.39 | 40 | 0.08 | 0.10 | 0.12 | 0.86 | 0.3 | 10.4 |
| 3 | 1-phenyl-3-amino-5-pyrazolone | 0.79 | 5 | 0.08 | 0.49 | 0.22 | 1.64 | 0.3 | 11.5 |
| 32 | 3,4-dimethyl-5-pyrazolone | 0.50 | 5 | 0.10 | 0.62 | 0.60 | 1.22 | 0.3 | 11.5 |
| 5 | 4-n-butyl-3, 5-diketo-1-phenylpyrazolone | 1.05 | 30 | 0.10 | 0.42 | 0.10 | 1.47 | 0.3 | 11.5 |
| 31 | 3-methyl-5-pyrazolone | 0.44 | 60 | 0.08 | 0.25 | 0.10 | 1.56 | 0.3 | 11.65 |
| 15 | 1-phenyl-3-methyl-4-β-hydroxyethyl-5-pyrazolone | 0.98 | 37 | 0.24 | 0.46 | 0.48 | 2.43 | 0.3 | 11.7 |
| 47 | 1,3-dimethyl-5-pyrazolone | 0.50 | 18 | 0.07 | 0.20 | 0.17 | 1.51 | 0.3 | 11.65 |
| 48 | 1,3-dimethyl-4-butyl-5-pyrazolone | 0.76 | 40 | 0.18 | 0.31 | 0.62 | 3.56 | 0.3 | 1.20 |
| 49 | 1,3-dimethyl-4β-hydroxyethyl-5-pyrazolone | 0.70 | 60 | 0.36 | 0.60 | 3.38 | 3.83 | 0.3 | 12.05 |
| 50 | 1-hydroxyethyl-3-methyl-4-butyl-5-pyrazolone | 0.89 | 60 | 0.01 | 0.62 | 0.46 | 2.87 | 0.3 | 14.65 |

EXAMPLE 12

A photographic film prepared by coating a silver halide emulsion without using gelatin as in Example 3 was used. As the base for the film, an under coated triacetyl cellulose was used.

Emulsion same as in Example 3   75 ml.
Water   100 ml.
p-Methoxyphenol (1/50 mole aq. soln.) Sodium 181.0 ml.
dodecylbenzene sulfonate (1% aq. soln.)   1.0 ml.

The above mixture was coated on the base in a dry thickness of about 5 microns and dried by heating.

An original of line image was placed on the film and the emulsion layer was exposed for 10 seconds to a xenone lamp of 500 Watts with a distance of 50 cm. and then immersed in the solution having the following composition to conduct the development and the polymerization;

3,4-Dimethyl-5-pyrazolone   5 g.
Sodium methacrylate (20% soln.)7   75 ml.
Potassium metabisulfite   12 g.
Borax   7.5 g.
Water   100 ml.
Methylenebis acrylamide   8 g.
2 N NaOH   necessary amount for adjusting the pH to 9.

When the film was allowed to stand for 15 minutes at 30°C., the exposed portion was developed to form a faint image. When the film was fixed and washed with water, the layer of the unexposed portion was dissolved off. When the remaining image was dyed by an aqueous solution of Rhodamine 6 G.C.P., the image was dyed, which showed a polymer having a negative charge was formed. Thus, a synthetic polymer was employed as the binder for the silver halide photographic emulsion of this invention instead of gelatin.

EXAMPLE 13

An emulsion having the following composition was coated on an under-coated triacetyl cellulose in a dry thickness of about 8 microns, Emulsion same as Example 1   35 ml.

emulsion layer was wetted by means of a sponge containing the developer having the following composition;

1-Phenyl-3-methyl-5-pyrazolone   0.783 g.
Potassium metabisulfite   1.6 g.
Water   10 ml.
2 N NaOH   7.9 ml.

Thereafter, the whole layer was covered by a glass plate to conduct the development and polymerization for one hour at 30°C. whereby a faint image was formed. The layer was fixed and rinsed with water, and the image was dyed as in Example 6. By the procedure, it was confirmed tha the exposed area was selectively dyed and hence a polymer had been formed at the area. Thus, by incorporating preliminary the monomer in the emulsion layer, the amount of the monomer could be reduced and the procedure of development and polymerization could be simplified.

EXAMPLE 14

By using Film A and Film B employing the following two kinds of silver iodo bromide emulsions, the polymerization of sodium methacrylate with 3,4-dimethyl-5-pyrazolone was conducted.

Film A: The both surfaces of a triacetate celllose film were undercoated, one surface of it was coated with the antihalation layer and the other surface was coated with a medium grain size photographic gelatino silver halide emulsion containing about 225 g of gelatin and 0.015 mole of iodine and 0.985 mole of bromine per mole of silver together with about 0.5 g of mucochloric acid per 100 g of gelatin and suitable additives such as a stabilizer and surface active agents. The emulsion was applied to the undercoated layer on the film base so that 60 mg of silver was present per 100 cm² of the emulsion layer and on the emulsion layer was further coated a protective layer of gelatin in a thickness of about one micron. Such a kind of photographic film is usually used for making positive image for photogravure.

Film B: On the undercoated support as in Film B was coated a fine-grain photographic gelatino silver halide emulsion, which contained about 204 g of gelatin, 0.012 mole of iodine and 0.988 mole of bromine per one mole of silver and is sensitized with aurous thiocyanate complex, together with 0.3 g of 6-methyl-4-hydroxy-1,3,3a,7-tetrazaindene per 1 mole of silver as a stabilizer, about 0.7 g mucochloric acid per 100 g of gelatin as a hardening agentin and a proper surface active agent in a density of silver of 60mg per 100 cm³ of the emulsion layer. Such a kind of photographic film is usually used for forming a line image and hard continuous tone image for photogravure.

Each sample of the films was exposed for 1/2 sec. to a light of 1,000 luxes and 2880°K in color temperature through an opitical step wedge of 0.15 in step difference and thereafter processed in the solution having the following composition :

Sodium methacrylate    60 g
3,4-Dimethyl-5-pyrazolone    6.4 g
Potassium pyrosulfite    2.4 g
Water    60 ml
2 N sodium hydroxide soln.    necessary amount for adjusting the pH to 9.0.

When the processing was conducted for 25 min. at 30°C., a faint brown was observed in each case. The emulsion layer was fixed and washed with water as in Example 6 and then dyed Rhodamine 6 G. C. P. to provide a dye image. The dye density was increased as the increase of the amount og light exposure.

EXAMPLE 15

A fine grain silver chloride emulsion in which fogging nuclei h had been formed chemically, prepared by a almost same method as described in the specification of British Pat. No. 667,206 was mixed with pinakryptol yellow as a desensitizer and suitable amounts of a hardening agent and a surface active agent the mixture was applied to an undercoated polyethylene terephthalate film to provide a Herschel effect-type aut-positive film. A line image original was placed on the emulsion layer and the layer was exposed to light of a xenon arc lamp of 2K. watts for 2 sec through a yellow filter from a distance of 50 cm and processed in the solution having the following composition.

Sodium methacrylate    60 g
1-Phenyl-3-methyl-5-pyrazolone    6.2 g
potassium pyrosulfite    2.4 g.
1-Phenyl-5-mercaptotetrazole    4 mg.
Water    60 ml.
2 N NaOH soln.    necessary for adjusting the pH to 10.

The 1-phenyl-5-mercaptotetrazole in the above composition was added as an antifoggant as a 0.1% methanol solution thereof.

After processing for 20 minutes at 30°C., the film was fixed and rinsed with water, and an image thus formed was dyed by Rhodamine 6 G.C.P., whereby a light brown silver image was formed on the area unexposed and only the image portion was dyed to provide a positive image to the original.

EXAMPLE 16

The photographic film as in Example 6 was exposed to X-rays and processed in the solution same as in Example 6.

The X-ray exposure was conducted by using a cobalt X-ray tube made by Philips Co. at 30 K.V. and 10 m. amp. for 3 sec. The sample was placed at the window of the X-ray tube with a distance of 1 cm. while covering a part of it with a razor blade having a thickness of 0.2 mm.

After processing for 30 minutes at 30°C. in the processing solution, the layer was fixed and washed with water and the image was dyed by Rhodamine 6 G.C.P. The silver image was formed only at the exposed portion and the portion was selectively dyed.

What is claimed is:

1. A process of forming a polymer image which consisting essentially of reacting a photographic silver halide emulsion, bearing a latent image with a reducing agent selected from the group consisting essentially of a 2-pyrazoline-5-one compound and a 3-pyrazoline-5-one compound in the presence of at least one compound selected from the group consisting of an addition polymerizable vinylidene monomer and vinyl monomer, whereby the polymerization of said monomer is selectively induced at the latent image bearing portion of the emulsion, said 2-pyrazoline-5-one compound represented by the formula:

wherein $R_1$ is a member selected from the group consisting of a hydrogen atom, an alkyl group, a substituted alkyl group, and acyl group, an aryl group, a substituted aryl group, and a heterocyclic group; $R_2$ is a member selected from the group consisting of a hydrogen atom, a hydroxyl group, an amino group, a substituted amino group, an alkyl group, a substituted alkyl group, a carboxyl group, an ester of said carboxyl group, an aryl group, and a substituted aryl group; and $R_3$ is a member selected from the group consisting of a hydrogen atom, an alkyl group, and a substituted formyl group, and said 3-pyrazoline-5-one compound is represented by the formula:

wherein $R_4$ is a member selected from the group consisting of a hydrogen atom and an aryl group; $R_5$ is a member selected from the group consisting of a hydrogen atom and an alkyl group; and $R_7$ is a member selected from the group consisting of an amino group and a substituted amino group.

2. The process of claim 1 wherein a bis- compound is formed by combining through said $R_2$ group.

3. The process of claim 1 wherein a bis- compound is formed by combining through said $R_3$ group.

4. The process of claim 1 wherein a bis- compound is formed by combining directly at the 4- position.

5. The process of claim 1 wherein said polymerization is conducted in the presence of a sulfite ion.

6. The process of claim 5 wherein the amount of sulfite ion present is greater than 0.5 moles per liter of the system.

7. The process of claim 6 wherein the amount of sulfite ion present is greater than 0.2 moles per liter of the system.

8. The process of forming an image according to claim 1 which comprises polymerizing at least one monomer having a group capable of acquiring a charge by ionic means and dyeing the thus formed polymer image capable of acquiring a charge with a dye having a charge opposite to that of the polymer.

9. The process of claim 8 wherein said monomer has a group capable of acquiring a negative charge by electrolytic dissociation and said dye is a basic dye.

10. The process of forming a dyed image which comprises transferring the dyed image formed from claim 9 to a suitable receptor sheet.

11. The process of claim 8 wherein said monomer has a group capable of acquiring a positive charge by the addition of a hydrogen cation and said dye is an acid dye.

12. The process of forming a dyed image which comprises transferring the dyed image formed from claim 11 to a suitable receptor sheet.

13. The process of forming a dyed image which comprises transferring the dyed image formed from claim 8 to a suitable receptor sheet.

14. The process of claim 1 wherein the vinyl compound is a member selected from the group consisting of acrylamide, acrylonitrile, N-hydroxymethyl acrylamide, methacrylic acid, acrylic acid, calcium acrylate, sodium acrylate, methyl methacrylate, methyl acrylate, ethyl acrylate, vinylpyrrolidone, vinlyl methyl ether, vinyl butyl ether, vinyl isopropyl ether, vinyl isobutyl either, vinyl butyrate, 2-vinyl pyridine, 4-vinyl pyridine, 2-methyl-N-vinylimidazole, potassium vinyl benzene sulfonate, and vinyl carbazole.

15. The process of claim 1 wherein said vinyl compound is a member selected from the group consisting of N-N'-methylene-bis-acrylamide, ethylene glycol dimethacrylate, diethylene glycol dimethacrylate, triethylene glycol dimethacrylate, polyethylene glycol dimethacrylate, divinyl ether and divinylbenzene.

16. The process of claim 1 wherein the reaction is carried out at a pH ranging from 6 to 7.

17. The process of claim 16 wherein the pH is 7.

18. The process of claim 1 wherein a high polymer is employed as the vehicle for the silver halide in said silver halide emulsion.

19. The process of claim 18 wherein a thermal polymerization inhibitor is present.

20. The process of claim 19 wherein the polymerization inhibitor is a member selected from the group consisting of p-methoxyphenol, hydroquinone, 2,6-di-tert-,butyl-p-cresol, and beta-naphthol.

21. The process of claim 19 wherein the polymerization inhibitor is present in an amount ranging from 10 to 20,000 parts per million of the weight of the vinyl compound.

22. The process of claim 18 wherein the amount of vinyl monomer employed ranges from 1/30 to 30 times the amount of high polymer which is originally present in the system.

23. The process of claim 22 wherein the amount of vinyl monomer employed ranges from one-fourth to 4 times the amount of high polymer which is originally present in the system.

24. The process of claim 18 wherein the amount of silver halide present ranges from one-twentieth to 2 times the amount of high polymer employed.

25. The process of claim 24 wherein the amount of silver halide present ranges from one-tenth to 1/2 times the amount of high polymer employed.

26. The process of claim 25 wherein the pyrazoline-one compound is added to the system prior to reaction.

27. The process of claim 26 wherein the amount of pyrazoline-one compound present ranges from one-tenth to 20 moles per mole of silver halide.

28. The process of claim 1 wherein the pyrazoline-one compound is dissolved in a processing solution, in an amount ranging from one-twentieth to 5 moles per liter.

29. The process of claim 28 wherein the amount of pyrazoline-one compound ranges from one-tenth to 1 mole per liter.

* * * * *